J. FLORENCE & C. FRAUER.
PIPE TESTING PLUG.
APPLICATION FILED JULY 2, 1915.
1,178,145.
Patented Apr. 4, 1916.
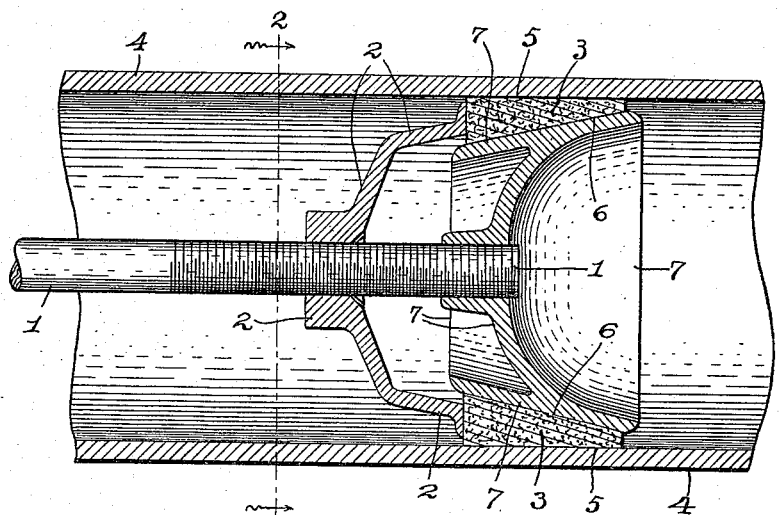
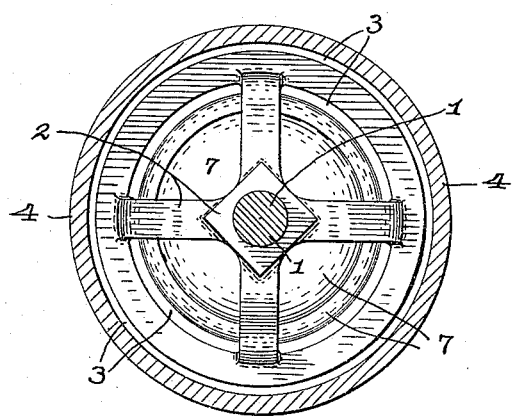

UNITED STATES PATENT OFFICE.

JOHN FLORENCE AND CHARLES FRAUER, OF INDIANAPOLIS, INDIANA.

PIPE-TESTING PLUG.

1,178,145.

Specification of Letters Patent.

Patented Apr. 4, 1916.

Application filed July 2, 1915. Serial No. 37,713.

*To all whom it may concern:*

Be it known that we, JOHN FLORENCE and CHARLES FRAUER, citizens of the United States, residing at Indianapolis, Marion county, and State of Indiana, have invented and discovered certain new and useful Improvements in Pipe-Testing Plugs, of which the following is a specification.

Our invention relates to pipe testing plugs and its object is to provide an efficient device of that class in which the pressure of the water forces the packing or closing gasket tightly against the wall of the pipe to be tested, and it particularly aims to provide a closing member of a construction that will not slip or roll or otherwise become displaced in the pipe when the pressure is applied, and at the same time will permit the expanding member to move freely against the surface of the gasket so as to compress the same tightly against the pipe.

With the above objects in view, our invention is embodied in preferable form in the device hereinafter described and illustrated in the accompanying drawings.

In these drawings Figure 1 is a vertical sectional view of the device and Fig. 2, a section on the line 2—2 of Fig. 1.

Referring to the drawings, 1 is a screw-headed rod on which the parts of the device are mounted and which may be provided with a suitable handle, if desired, for convenience in inserting the device within the pipe to be tested. Mounted on the lower threaded part of this rod is an adjustable tightening cap or nut 2, the inner end of which is adapted to bear against an open annular rubber gasket 3, constituting the packing and closing member of the device. This rubber gasket annulus consists of a substantially cylindrical body elongated in the line of the pipe 4 and having a plain, straight cylindrical outer wall 5 and an inwardly inclined inner wall 6, these walls forming a hollow elongated gasket wedge-shaped in cross section with the smaller end at the lower part of the device and directed toward the lower open end of the pipe to be tested.

Mounted on the lower end of the screw rod is an open cup-shaped conical expanding plug 7, the outer inclined wall of which is adapted to bear against the inside wall of the gasket 3. The lower end of this conical plug is preferably slightly rounded or inclined inwardly on its outer surface for the purpose of permitting the plug to slide in more readily on the surface of the elongated gasket. The outer surface of this plug is highly polished in order to permit the plug to slide freely within the gasket while the latter is held by friction against the side of the wall so that an outward expansive force will be exerted by the plug against the gasket to force the latter against the pipe. A suitable lubricant should be interposed between the outer wall of the conical plug and the inner wall of the gasket.

In the use of the device, a suitable lubricating agent having been applied to the outer surface of the conical plug, and the gasket placed thereon and the screw cap applied to the rod, the device is inserted within the pipe to be tested and the screw cap is turned down, so as to compress the gasket closely against the inner surface of the wall of the pipe or when required, to expand the gasket outward sufficiently to accommodate it to a pipe of slightly greater diameter than the normal width of the gasket. When water is admitted to the pipe at the lower end for the purpose of testing the system of which the pipe forms a part, the pressure against the under cup-shaped surface of the conical plug will force the same inwardly, the plug sliding on the elongated smooth inner surface of the gasket and exerting a wedge action thereon which will expand the gasket throughout its length against the inner surface of the wall of the pipe, thus tightly closing said pipe. The lower rounded end of the conical plug and the polished surface thereof permit the plug to slide on the gasket without moving the latter with the plug while the plug itself is retained tightly in position against the pipe by the friction between the metal of the pipe and the rubber of the gasket. Owing to the elongated, outer bearing surface of the gasket, the same will have an extensive area of frictional contact with the surface of the pipe, which pipe, as is usual, is made of cast or wrought iron and hence the gasket will be firmly held against movement, as distinguished from those devices in which the packing member consists merely of a rubber ring, the tendency of which is to roll and slip in the pipe and which present but a narrow surface of contact between the packing member and the pipe surface. The elongated cylindrical form of the gasket also holds the gasket in straight alined position within the pipe and prevents the same from being tilted and forced inwardly on one side thereof only, as frequently happens with gaskets formed of rubber rings. The elongated surface also gives greater assurance of a tight joint.

Having thus described our invention what we claim is:

1. A pipe testing plug having an open annular gasket of elastic material with an elongated substantially cylindrical outer wall providing a long bearing surface against the wall of the pipe to be tested, and an expanding member mounted within the pipe and having a fluid receiving face at that end of the plug against which the fluid pressure is directed and bearing against the inner surface of said gasket and operable to slip on the gasket under water pressure applied thereto.

2. A pipe testing plug comprising an open annular gasket of elastic material having an outer cylindrical wall elongated in the line of the pipe and having an inner inclined wall, and a conical cup-shaped expanding plug fitting against said inner wall and adapted to move inwardly within the pipe relatively to the gasket on the application of water pressure thereto, said cup-shaped portion being at the end of the plug against which the fluid pressure is directed.

3. A pipe testing plug having an elongated, substantially cylindrical open, annular gasket of elastic material adapted to fit the wall of a pipe and a conical recessed expanding plug adapted to bear against the inner wall of the gasket and adapted to directly receive the fluid pressure and to slip relatively to the gasket under said pressure and having an outer polished surface on the wall that bears against said gasket.

4. A pipe testing plug having an open annular packing gasket of elastic material of substantially cylindrical form and elongated in the line of the axis of the cylinder and having an inclined inner wall, a conical expanding plug bearing against the inner wall of the gasket and having the outer end thereof inclined inwardly.

5. A pipe testing plug comprising a threaded supporting rod, a conical expanding plug mounted on the inner end of said rod and having a cup-shaped portion directed against the flow of fluid to be admitted to the pipe, an elongated substantially cylindrical rubber open annular gasket wedge-shaped in cross section mounted on the outer surface of said plug, and an adjustable tightener cap mounted on the threaded portion of said rod and having means to bear against the inner end of said gasket.

In witness whereof, we have hereunto set our hands and seals at Indianapolis, Indiana, this 29th day of June, A. D., nineteen hundred and fifteen.

JOHN FLORENCE. [L. S.]
CHARLES FRAUER. [L. S.]

Witnesses:
A. C. Rice,
H. P. Doolittle.

Copies of this patent may be obtained for five cents each, by addressing the "Commissioner of Patents, Washington, D. C."